Oct. 26, 1926.　　　　　　　　　　　　　　　　1,604,656
L. A. MROZ
AUTOMOBILE LOADING DEVICE FOR TRUCKS
Filed July 27, 1922　　　6 Sheets-Sheet 1
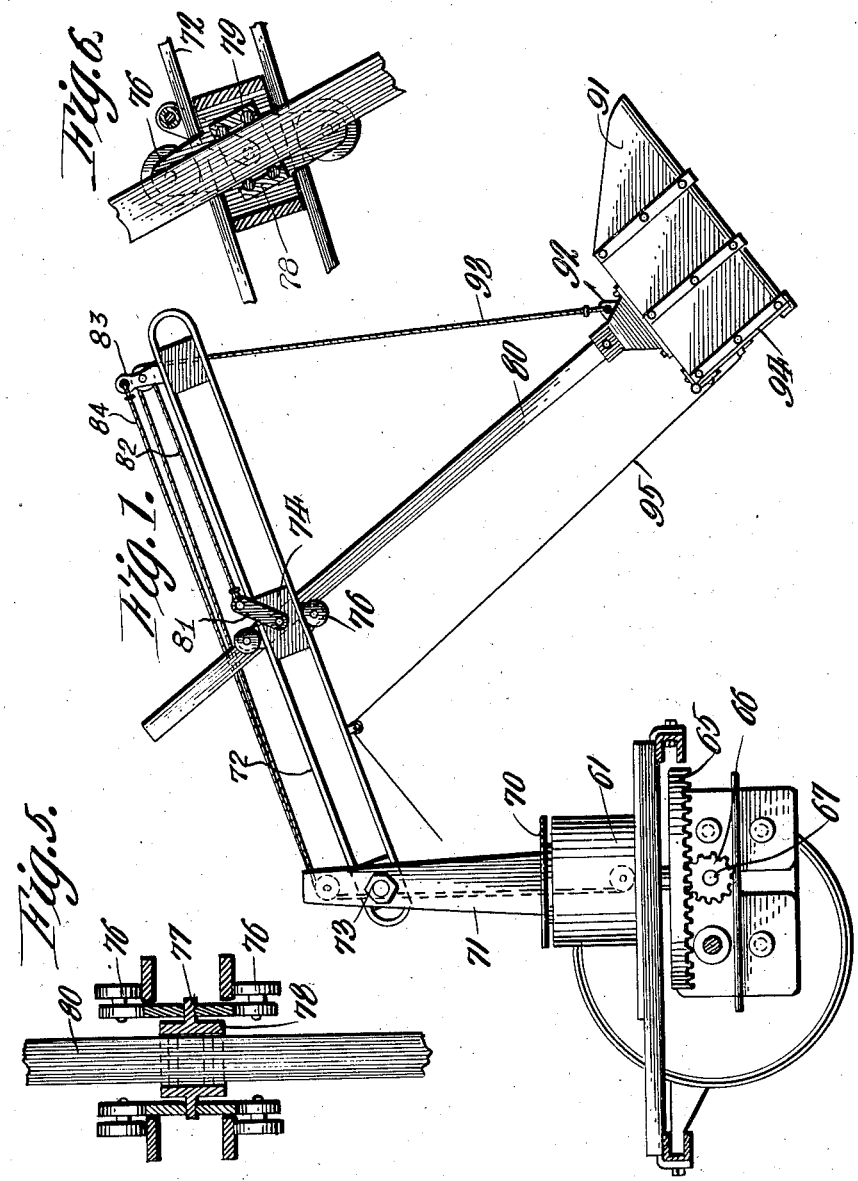
WITNESSES
Inventor
LEON A. MROZ

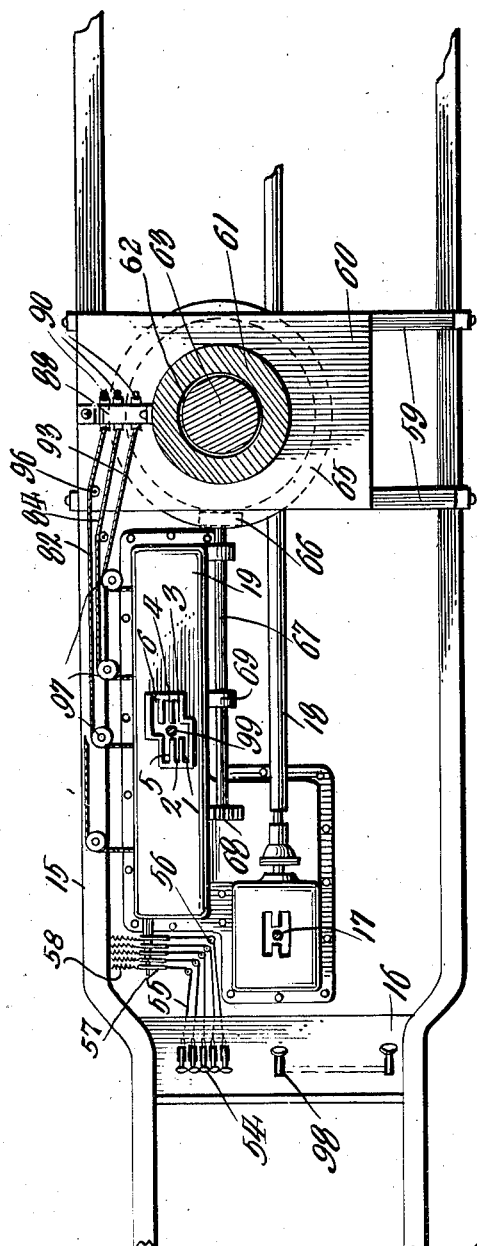

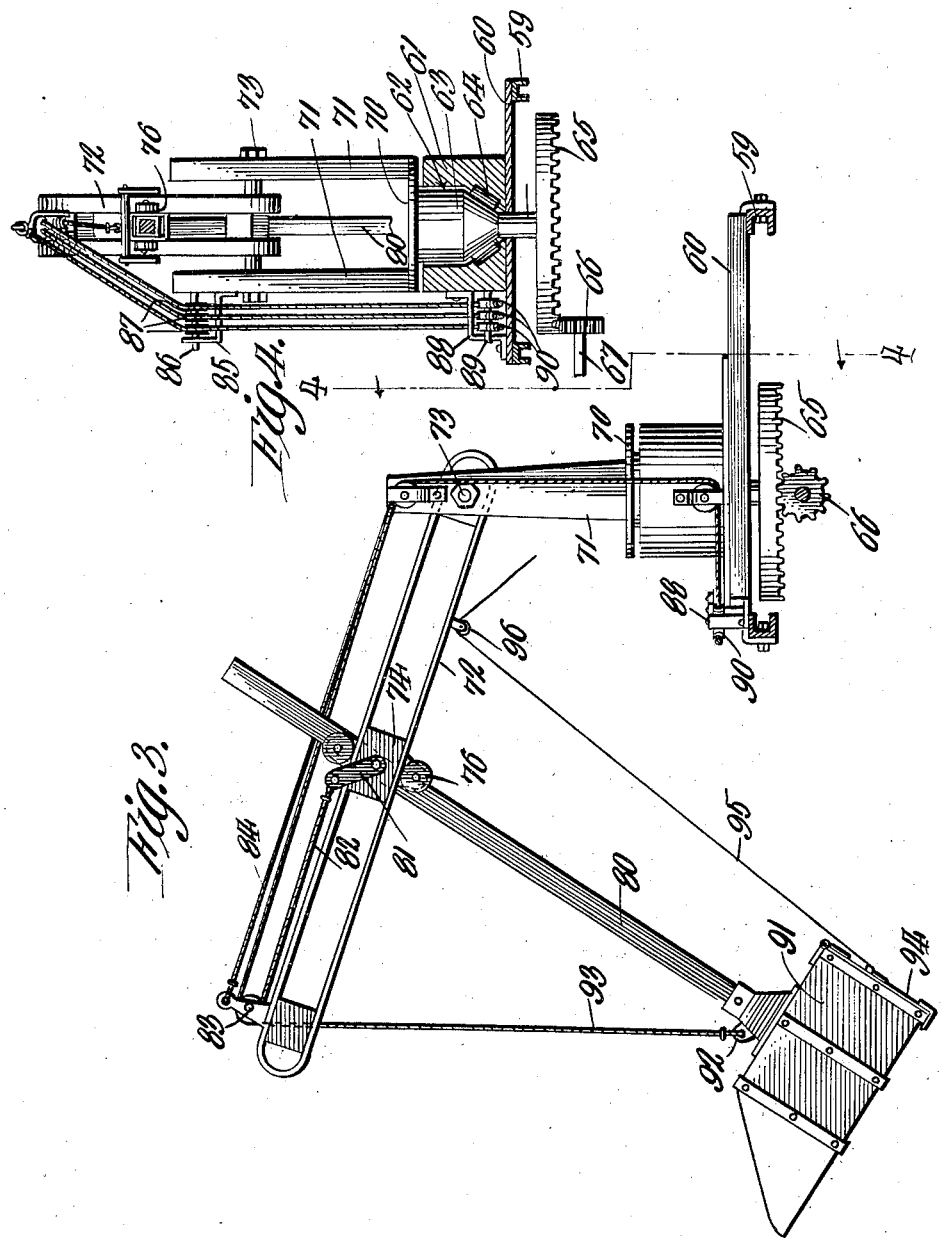

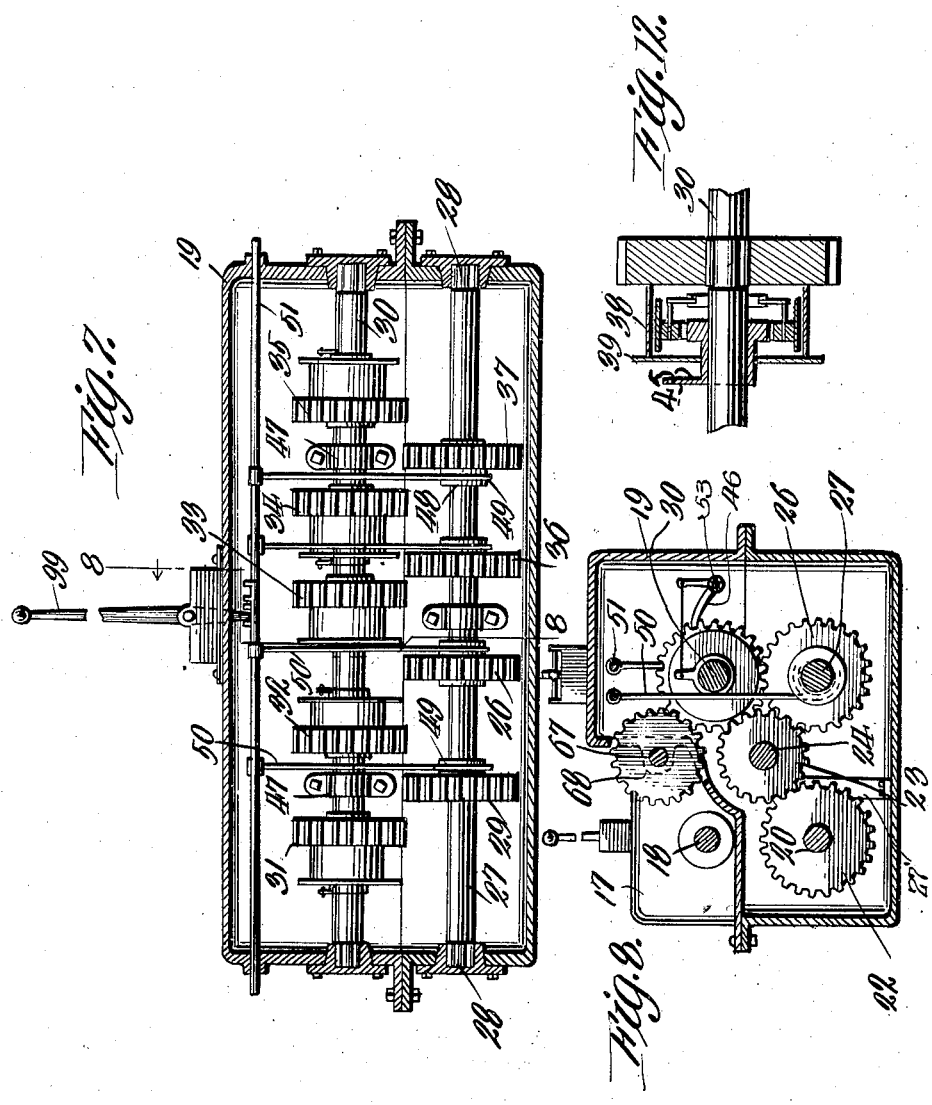

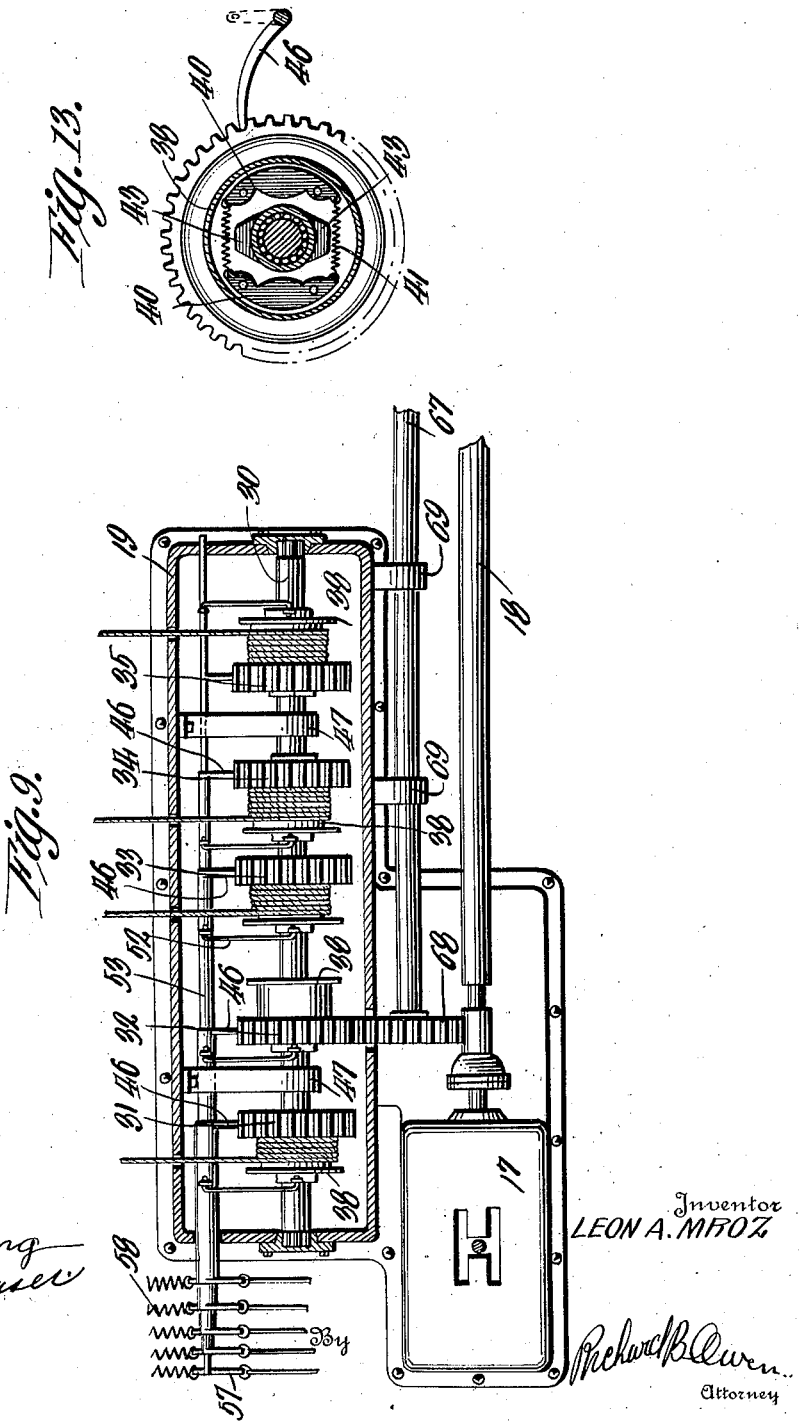

Oct. 26, 1926.
L. A. MROZ
1,604,656
AUTOMOBILE LOADING DEVICE FOR TRUCKS
Filed July 27, 1922     6 Sheets-Sheet 6
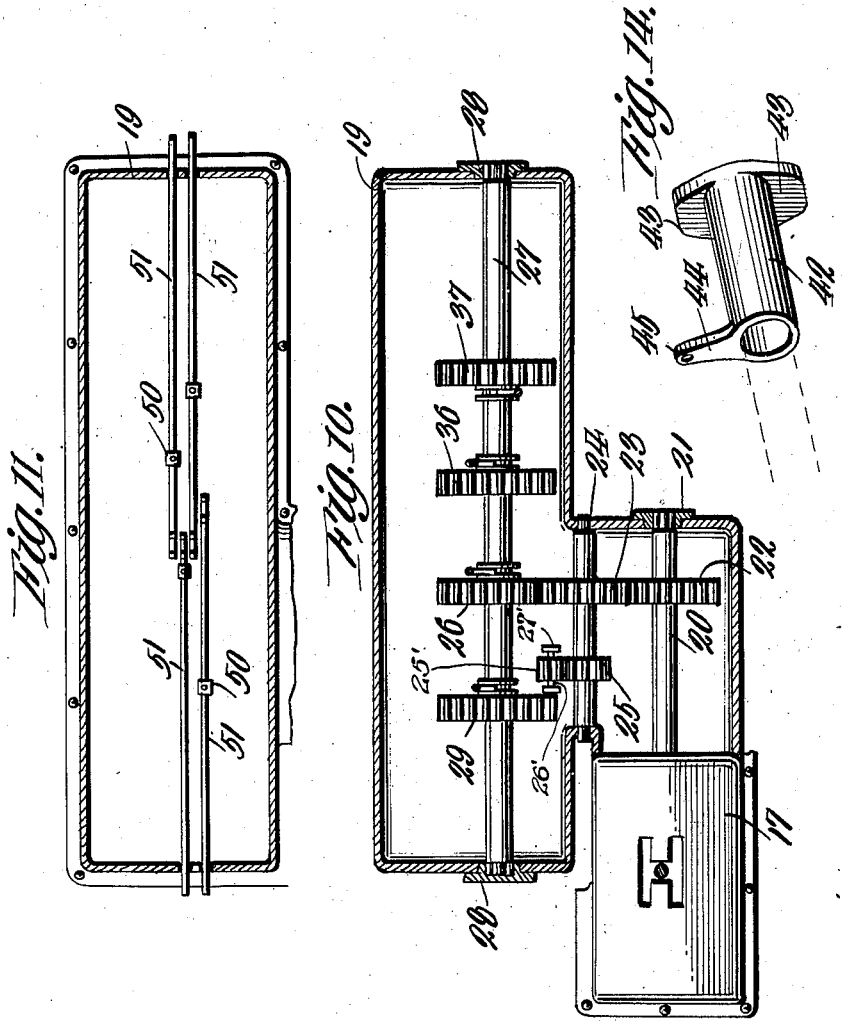
WITNESSES
Inventor
LEON A. MROZ
By
Attorney Patented Oct. 26, 1926.

1,604,656

UNITED STATES PATENT OFFICE.

LEON A. MROZ, OF BRIDGEPORT, PENNSYLVANIA.

AUTOMOBILE LOADING DEVICE FOR TRUCKS.

Application filed July 27, 1922. Serial No. 577,939.

My invention relates to automobile loading device for trucks.

An object of my invention is to provide a loading device for automobile trucks, that utilizes the power of the truck engine, to operate the same.

A further object of my invention is to provide a loading device for automobile trucks, that may be easily manipulated from the driver's seat.

A still further object of my invention is to provide a loading device for automobile trucks, that may be permanently mounted on said truck, and that may be swung into and out of engagement with ease.

A still further object of my invention is to provide a loading device for automobile trucks, that may be used to load any material, such as snow, dirt, coal or in fact any loose ore.

A still further object of my invention is to provide a loading device for automobile trucks, that will not interfere in any way with the operation of the truck, while the same is in transit.

A still further object of my invention is to provide a loading device for automobile trucks, that may be mounted on any form of automobile truck now in use, with very little trouble, and that will consume but little space, so that the truck will not be hindered in going through heavy traffic, and which will increase the utility of a truck.

A still further object of my invention is to provide a loading device for automobile trucks, that is strong, durable, comparatively simple and inexpensive in construction, and that is well adapted to the use for which it is designed.

Other objects and advantages of the invention will become apparent during the course of the following description.

In the accompanying drawings forming a part of the specification and in which like numerals are employed to designate like parts throughout the same, Figure 1 is a side elevation of the turn table, crane and scoop used in accordance with my invention, Figure 2 is a top plan view of automobile truck chassis, showing parts of my invention mounted thereon, Figure 3 is a side elevation of the turn table, pedestal, crane and scoop, illustrating the connection of one of the operating cables, Figure 4 is a section taken on line 4—4 of Figure 3, looking in the direction of the arrow, showing the pedestal in section for the purpose of illustration, Figure 5 is a transverse section of the scoop and carriage block, Figure 6 is a longitudinal section of the same.

Figure 7 is a longitudinal section of the transmission used in accordance with my invention, Figure 8 is a section taken on line 8—8 of Figure 7 looking in the direction of the arrow, Figure 9 is a top plan view of the transmission, showing the housing in section, for the purpose of illustration, Figure 10 is a top plan view of the transmission used in my invention, showing the housing in section and a portion of the gearing removed, Figure 11 is a top plan view of the transmission, illustrating the shift rods, Figure 12 is a longitudinal section taken through one of the gears on which is mounted a drum and a brake for said drum, Figure 13 is a front elevation of one of the gears, on which is mounted the drum, said drum being broken away in section to more clearly illustrate the form of brake used in accordance with my invention, and Figure 14 is a detailed perspective of the brake operating mechanism.

In the drawings, wherein for the purpose of illustration is shown a preferred embodiment of my invention, the numeral 15 designates any form of conventional chassis that is commonly used in automobile trucks, and the numeral 16 represents the ordinary foot board. The ordinary form of transmission is designated by the numeral 17 to which is connected the ordinary driving shaft 18.

Some of the trucks now in use, have the exhaust pipe and muffler mounted on the right-hand side of the truck, but these may be easily moved to the left-hand side, in order that my supplementary transmission may be mounted on the right-hand side of the ordinary transmission, as is clearly illustrated in Figure 2 of the drawings. My supplementary transmission may be supported by any form of brackets or hangers, not shown, desired. The housing of my supplementary transmission is designated by the numeral 19 and is connected to the ordinary housing of the ordinary transmission 17 in any desired manner.

It is necessary to extend the lower or counter shaft 20 of the transmission 17, a substantial distance, as is clearly illustrated in Figure 10 of the drawings, the outer end thereof being seated in a bearing 21, said bearings 21 being mounted in the housing 19. A driving gear 22 is keyed to the shaft 20 and is adapted to mesh with an intermediate gear 23 which is keyed on a shaft 24 which is mounted in the housing 19, said gear 23 being the forward driving gear. A reversing gear 25 is also mounted on the shaft 24, which is adapted to constantly mesh with an idle pinion 25' carried by a suitable supporting shaft 26' secured to brackets 27'. The intermediate forward driving gear 23 is adapted to mesh with the driving gear 26, which is slidably mounted on the shaft 27, the end of said shaft 27 being adapted to be received within a bearing 28 which is mounted in the end of the housing 19. The gear 26 is adapted to be slid into and out of engagement with the gear 23, as will be more clearly hereinafter described, and likewise a reversing gear 29, which is also slidably mounted on the shaft 27 is adapted to be slid into and out of engagement with the idle pinion 25'.

Mounted above the shaft 27 is a driving shaft 30 which has five gears mounted thereon in spaced relation, which will be more fully discussed as we proceed. The gears 23 and 25 on the shaft 24 and the gear 22 on the shaft 20 are not adapted to be moved on their respective shafts, but the gears 23 and 25 are in such a position that the gears 26 and 29 are adapted to be slid into engagement therewith. On the shaft 27 are two gears 36 and 37 respectively in addition to the gears 26 and 29 and the said gears 26, 29, 36 and 37 are adapted to be slid into engagement with their respective gears which are mounted on the shaft 30.

The five gears on the shaft 30 cooperative with the gears on the shaft 27 as follows. The gear 29 is thrown into engagement with the gear 31 when it is desired to dump the truck body, the gear 29 is brought into engagement with the gear 32 when it is desired to swing the crane, that is to rotate the turn table. The gear 36 on the shaft 27 is adapted to be slid into engagement with the gear 33 when it is desired to hoist the arm, and it will readily be seen that the weight of the arm will lower the same. The gear 37 on the shaft 27 is adapted to be slid either to the right or left to mesh with either the gear 34 or 35 on the shaft 30, as the case may be. The gear 34 is meshed with the gear 37 when it is desired to hoist the crane, and the gear 37 is meshed with the gear 35 when it is desired to hoist the shovel. It is of course to be understood that the five gears on the shaft 30 are not slidable, but are permanently fixed thereto, and that the four gears on the shaft 27 are adapted to be slidably mounted thereon, and to be slid into engagement with their respective gears on the shaft 30. When the gear 26 is brought into engagement with the intermediate gear 23, the gears on the shaft 30 are rotated forwardly when they are meshed with their respective gears on the shaft 27. However, when it is desired to reverse the rotation of the shaft 30, the gear 26 is slid out of engagement with the intermediate gear 23, and the shaft 29 is slid into engagement with the reversing gear 25 on the shaft 24.

Each of the five gears on the shaft 30 is provided with a suitable drum 38, which is bolted thereto. Each drum 38 is provided with a flange 39 so that a cable may be wound on the drum 38 without slipping off. Each drum is provided with a braking mechanism, which is clearly illustrated in Figure 13 of the drawings. The braking mechanism consists of two members 40 which are adapted to frictionally engage the inner surface of the drum 38, to prevent the rotation of said drum. The frictional members 40 are normally held out of contact of the inner surface of the drums 38 by means of suitable springs 41. Figure 14 clearly illustrates the operating mechanism for the braking elements 40. In Figure 14, the numeral 42 designates a sleeve which is adapted to be mounted on the shaft 30, said sleeve 42 being provided at one end with the cam surfaces 43, which are adapted, when rotated by means of the arm 44 which is provided with the opening 45 to which suitable connection may be made, to force the frictional members into contact with the drum 38. Each of the gears on the shaft 30 is provided with a pawl 46 which is adapted to be moved into and out of engagement with the gear teeth as is desired.

The shafts 27 and 30 are supported intermediate their ends by means of brackets 47. Each of the gears on the shaft 27 is provided with a collar 48 which is provided with annular groove 49 which is adapted to receive the ends of a forked rod 50. The rods 50 are mounted on longitudinal rods 51 and are adapted to move therewith. It will thus be seen that by movement of the longitudinal rods 51, the vertical rods 50 will likewise be moved thereby sliding the gears along the shaft 27.

The arm 44 in Figure 14, is operated by means of a link 52, which is connected to the telescopic rods 53. Each of the telescopic rods 53 carries a pawl 46, as clearly shown in Figure 8 of the drawing, and upon operation of the rods in one direction the pawls are adapted to engage the gears for holding the same against movement and when the rods are operating in the opposite directions the pawls are moved out of engagement with the gears. By looking at Figure 2, it will readily be seen that there are five brake pedals designated in their entirety by the numeral 54, each brake pedal being connected to a cable 55 which operates over the pulleys 56, and are connected to the arms 57 which are mounted on the ends of the rods 53. Springs 58 are mounted on the arms 57 to normally hold the brakes out of contact with the drums. It will thus be seen that when the hoist arm or the like has been raised to the desired position, it may be held in such position, by applying the right brake, and the ratchet 46 will engage the gear wheel and hold the same until said power is released.

In Figure 2 of the drawings, the numeral 59 designates cross pieces which are mounted on the chassis side members 15, said cross pieces being adapted to support a base 60. A pedestal 61 is mounted on the base 60 and is provided with a recess 62 which is so formed as to receive a shaft 63 which bears on the bearing 64. Extending through an opening in the base 60 is a reduced portion of the shaft 63, and is keyed to a turn table or gear 65. The gear 65 is adapted to mesh with a pinion 66 which is keyed on the end of the shaft 67, said shaft 67 being provided on its opposite end with a gear 68 which meshes with the gear 32. The shaft 67 is supported by means of brackets 69 which are fastened to the housing 19. It will thus be seen that by rotation of the gear 32, the gear 68 will rotate, thereby rotating the shaft 67, which will rotate the turn table 65. Mounted on the top of the shaft 63 is a table member 70 which carries the standards 71. A crane arm 72 is pivoted at one end between the standards 71 by means of the shaft 73 and is adapted to be pivoted for swinging movement upwardly or downwardly, or to rotate in whatever direction the gear wheel 65 is rotated. Adapted to slide along the crane arm 72 is the carriage block 74. The carriage block is provided with the wheels 75 so as to facilitate the movement of the carriage block 74 along the crane arm 72, and also to act as a hanger for the same. It will be seen that the rollers 76 will cause but very little friction, and will need but very little power to move the carriage block along the crane arm 72. Pivoted to the carriage block by means of the spindles 77 is a shovel beam guide 78, being provided with the bearings 79, in order that the shovel beam 80 will reciprocate easily within said guide. An arm 81 is fastened to the carriage 74, in order that a cable 82 may be fastened thereto, to move the carriage block 74 along the crane arm 72.

Mounted near the end of the crane arm 72 is an upstanding arm 83, to which is attached a cable 84. Mounted on one of the standards 71 is a bracket 85, which carries a shaft 86 upon which are mounted the pulleys 87 over which run the cables, and a similar bracket 88 carrying an axle 89 on which are mounted pullies 90 is mounted on the pedestal 61 and the base 60.

The numeral 91 designates any type of shovel or scoop which is mounted on the end of the shovel beam 80 and is provided with the boss 92, to which is attached the cable 93 which operates the shovel. A pivoted door 94 is operated by a suitable cable 95 which runs over the pulleys 96 which is mounted onto the crane arm 72, said cable 95 running to the cab of the truck, so that the same may be operated by the driver. It will be seen that the cables 82, 84 and 93 pass around the pulleys 96 and 97 to their respective drums 38.

In Figure 2 of the drawings, it will be seen that my transmission is provided with six different shifts, being numbered 1, 2, 3, 4, 5 and 6, the shift number 1 being adapted to put my transmission in gear, shift number 2 being adapted to swing the crane, shift number 3 being adapted to dump the truck, shift number 4 being adapted to hoist the crane, shift number 5 being adapted to hoist the shovel, and shift number 6 being adapted to hoist the arm. Furthermore, I have provided a separate operating pedal 98 as is clearly shown in the drawing. A suitable shift lever 99 is provided, which when shifted into its various positions engage one of the rods 51 which slide the gears, according to which position the shift lever is put.

After the apparatus embodying my invention is mounted on an automobile truck as is clearly shown in the drawings, the operation is as follows:

The ordinary transmission designated by the numeral 17 is put into neutral, and it is now possible to operate my supplementary transmission to manipulate the scoop. It is to be understood that the gear shift 99 should be in the slot designated by the numeral 1, in order that my supplementary transmission be in neutral. When the gear shift lever 99 is removed from shift 1 the gear 26 is slid along the shaft 27 in such a position that it meshes with the gear 23. The gear 23 is the forward driving gear. When the gear 26 is in mesh with the gear 23, and the gear lever is put into the slot number 3, thereby causing the gear 29 to mesh with the gear 31, the truck body dumping mechanism is set into operation. As I do not claim as part of my invention the specific construction of the dumping mechanism, I have not illustrated or described the same in my application. However, whatever form of dumping mechanism is used should be geared to the gear 31 on the shaft 30. When it is desired to rotate the turn table or gear 65, the gear 29 on the shaft 27 is moved in such a manner that it meshes with the gear 32, by shifting the gear lever into the slot designated by the numeral 2. The gear 32 meshes with the gear 68 which is keyed to the shaft 67, said shaft 67 being provided on its opposite end with the gear 66 which meshes with the turn table or gear 65 thereby rotating the same.

When it is desired to move the carriage block 74 along the crane arm 72, the gear 36 is slid along the shaft 27 so that it will mesh with the gear 33, by putting the gear shift in the slot designated by the numeral 6. The rotation of the gear 33 will wind the cable 82 on the drum thereby causing the carriage block 74 to slide along the crane arm 72 toward its outer end. When it is necessary to raise the crane arm 72, the gear shift lever is put into the slot designated by the numeral 4 thereby causing the gear 37 to move to the left as is shown in Figure 7, causing it to mesh with the gear 34. The rotation of the gear 34 will cause the drum to be rotated thereby winding the cable 84 thereon, and by reason of the cable 84 being connected to the upstanding arm 83 on the end of the crane arm 72 and by reason of the crane arm 72 being pivoted at 73, the outer end of the crane arm will be raised. In order to raise the shovel 91, the gear shift lever is put into the slot designated by the numeral 5, which will slide the gear 37 to the right on the shaft 27, thereby causing the same to mesh with the gear 35 which will rotate the drum thereby winding the cable 93 thereon and raising the shovel 91 to any desired position. It is to be understood that in order to rotate the various gears, the corresponding brake member 54 must be operated simultaneously. When the gear has been rotated sufficiently, the brake pedal is released thereby causing the braking members 40 to frictionally engage the drum 38 and also to allow the pawl 46 to engage the teeth of the gear and to hold the same in a fixed position. It will thus be seen that I can drive a truck which is provided with my invention, alongside of a pile of dirt or the like, and load the dirt or the like upon the truck in a comparatively short time, with very little labor and expense. When the truck is loaded, the shovel is hoisted up on the top of the load, and is carried in such position, so that it will be entirely out of the way and will not cause any inconvenience going through heavy traffic.

It is to be understood that the form of my invention herewith shown and described is to be taken as a preferred embodiment of the same, and that various changes in the shape, size and arrangement of parts may be resorted to without departing from the spirit of my invention or the scope of the subjoined claims.

Having thus described my invention, I claim:

1. The combination with an automobile truck including a chassis, an engine rigidly mounted upon the chassis having a drive shaft, of a loading device for the truck including a crane base rigidly mounted on the chassis, a pedestal provided with a recess secured to the crane base, a shaft seated within said recess for rotary movement relative to the chassis and said engine, a turn table secured to the lower end of the shaft, vertical standards mounted on the upper end of the shaft, a crane arm pivoted to said vertical standards, a carriage block carried by said crane arms, a shovel beam guide carried by said carriage block, and means for independently operating the turn table, the crane arm and carriage block from said drive shaft.

2. The combination with an automobile truck including a chassis, and an engine rigidly mounted upon the chassis having a drive shaft, of a loading device for the truck including a pedestal mounted upon the chassis and provided with a recess, a shaft seated within said recess for rotary movement, vertical standards mounted on the upper end of the shaft, a crane arm pivoted to said vertical standards, a carriage block carried by said crane arm, a shovel beam carried by said carriage block, and means for independently operating the shaft, the crane arm and carriage block from the said drive shaft.

3. The combination with an automobile truck including a chassis, of a loading device for the truck including a pedestal mounted upon the chassis and provided with a recess, a shaft seated within said recess for rotary movement, a turn table secured to the lower end of the shaft, vertical standards mounted on the upper end of the shaft, a crane arm pivoted to said standards, a carriage block carried by said crane arm, and means for independently operating the turn table, the crank arm and carriage block.

In testimony whereof I affix my signature.

LEON A. MROZ.